United States Patent
Adams et al.

[11] 3,744,920
[45] July 10, 1973

[54] DETECTION SYSTEM

[75] Inventors: James E. Adams, Ontario; Werner E. L. Haas, Webster, both of N.Y.

[73] Assignee: Xerox Corporation, Stamford, Conn.

[22] Filed: Jan. 6, 1971

[21] Appl. No.: 104,344

[52] U.S. Cl. ............... 356/256, 356/237, 350/160, 324/96
[51] Int. Cl. ...................... G02b 27/32, G01n 21/16
[58] Field of Search ................ 73/104, 105; 324/96; 350/160; 356/256

[56] References Cited
UNITED STATES PATENTS

| | | | |
|---|---|---|---|
| 3,647,280 | 3/1972 | Klein et al. | 350/160 LC |
| 3,650,608 | 3/1972 | Baker | 350/160 LC |
| 3,439,525 | 4/1969 | Waterman et al | 73/104 |

*Primary Examiner*—Ronald L. Wibert
*Assistant Examiner*—Conrad Clark
*Attorney*—James J. Ralabate, Gaetano D. Maccarone and David C. Petre

[57] ABSTRACT

A system for identifying the presence of physical surface patterns and/or areas in a surface which have different electrical conductivity characteristics from those of adjacent areas of the same surface. The system utilizes the optical characteristics of liquid crystal films having optically negative properties.

26 Claims, 3 Drawing Figures

Patented July 10, 1973

3,744,920

INVENTORS
JAMES E. ADAMS
WERNER E. L. HAAS
BY J. D. Maccarone

ATTORNEY

DETECTION SYSTEM

BACKGROUND OF THE INVENTION

This invention relates to a system for detecting physical and/or electrical conductivity patterns in a surface of interest and more particularly to such a system which utilizes the optical characteristics of liquid crystal substances having optically negative properties.

Liquid crystalline substances exhibit physical characteristics some of which are typically associated with liquids and others which are typically unique to solid crystals. The name "liquid crystals" has become generic to substances exhibiting these dual properties. Liquid crystals are known to appear in three different forms: the smectic, nematic, and cholesteric forms. These structural forms are sometimes referred to as mesophases thereby indicating that they are states of matter intermediate between the liquid and crystalline states. The three mesophase forms of liquid crystals mentioned above are characterized by different physical structures wherein the molecules of the compound are arranged in a molecular structure which is unique to each of the three mesomorphic structures. Each of these three structures is well known in the liquid crystal art.

Liquid crystals have been found to be sensitive or responsive to temperature, pressure, shear, foreign chemical compounds and to electric and magnetic fields as disclosed in co-pending applications Ser. No. 646,532, filed June 16, 1967, Ser. No. 646,533, filed June 16, 1967 and now abandoned, Fergason et al. U.S. Pat. No. 3,114,838, French U.S. Pat. No. 1,484,584 and Fergason U.S. Pat. No. 3,409,404. Liquid crystals have also been found to be useful in imaging systems such as are described in co-pending applications Ser. No. 821,565, filed May 5, 1969 now U.S. Pat. No. 3,652,148 and Ser. No. 867,593, filed Oct. 20, 1969 now U.S. Pat. No. 3,642,348.

A great variety of very sophisticated and complex articles of manufacture and apparatus are employed in modern technology. For example there are known materials which can withstand tremendously high temperatures without being destroyed and thus are suitable for use in missile nose cones. The detection of flaws in these materials is extremely important since the presence of even a minute flaw can cause material failure during performance. For materials used in other applications, e.g., optics in precision instruments, a smooth surface free of physical deformation is essential. Thus, there exists a need for extremely sensitive detection systems which can be employed to identify the presence of such patterns in materials and which do not damage the material being analyzed in even the slightest manner.

In growing areas of technology such as liquid crystals, new methods, apparatus, compositions and articles of manufacture are often discovered for the application of the technology in a new mode. The present invention relates to a novel and advantageous system for identifying physical and/or electrical conductivity patterns in a surface of a material.

SUMMARY OF THE INVENTION

It is therefore an object of this invention to provide a novel detection system having the above-identified desirable features.

It is another object of the invention to provide a detection system which utilizes the optical characteristics of liquid crystal substances having optically negative properties.

It is still another object of the invention to provide a detection system which is extremely sensitive to pressure.

It is yet another object of the invention to provide a detection system which is extremely sensitive to electric fields.

Yet still another object of the invention is to provide a non-destructive detection system.

A still further object of the invention is to provide an inexpensive detection system.

Another object of the invention is to provide a method for the detection of physical and/or electrical conductivity patterns in a surface.

Still another object of the invention is to provide devices suitable for the detection of physical and/or electrical conductivity patterns in a surface.

The above-described and other objects and advantages are realized in accordance with the invention by utilizing the optical characteristics of liquid crystal substances having optically negative characteristics. Generally, the detection system of the invention makes use of a device comprising a thin layer of optically negative liquid crystal substances disposed on a supporting substrate which typically is a thin layer of a material having suitable physical properties to carry the liquid crystal layer and which may be flexible or rigid. Optionally, the top surface of the liquid crystal layer may be covered with a protective element which may be any suitable optically transparent material. The detection device is typically utilized by placing the support substrate against the surface to be analyzed. Subsequently, by proceeding according to various preferred embodiments of the invention which will be described in detail hereinafter, physical deformation and electrical conductivity patterns present in the surface being analyzed can be quickly and efficiently identified.

Birefringence, also called double refraction, is an optical phenomenon characteristic of some solid crystals and most liquid crystal substances. When a beam of unpolarized light strikes a birefringent substance, it is split into two polarized components whose transverse vibrations are at right angles to each other. The two components are refracted at different angles through the substance and emerge as beams of polarized light. By the term "liquid crystalline substance which has optically negative properties" as used herein is meant one for which the extraordinary index of refraction $n_E$ is smaller than the ordinary index of refraction $n_O$. For a detailed description of this phenomenon see *Optical Crystallography*, Wahlstrom, 4th Edition, Wiley and Sons, New York.

Cholesteric liquid crystal substances exhibit optically negative characteristics. The molecules in cholesteric liquid crystals are arranged in very thin layers with the long axes of the molecules parallel to each other and to the plane of the layers within each layer. Because of this configuration of the molecules the direction of the long axes of the molecules in each layer is displaced slightly from the corresponding direction in adjacent layers. This displacement is cumulative over successive layers so that overall displacement traces out a helical path. A comprehensive description of the structure of cholesteric liquid crystals is given in *Molecular Struc-*

*ture and the Properties of Liquid Crystals*, G. W. Gray, Academic Press, 1962.

Cholesteric liquid crystals have the property that when the propagation direction of plane polarized or unpolarized light is along the helical axis thereof, white light is essentially unaffected in transmission through thin films of such liquid crystals except for a wavelength region centered about some wavelength λ0 where λ0 equals 2 $np$ with $n$ representing the index of refraction of the liquid crystal substance and $p$ the pitch or repetition distance of the helical structure. For light of a wavelength λ0 the cholesteric liquid crystal, under these conditions, exhibits selective reflection of the light such that approximately 50 percent of the light in this region is reflected and approximately 50 percent is transmitted (assuming negligible absorption which is usually the case) with both the reflected and transmitted beams being approximately circularly polarized. For light having wavelengths around λ0 but not at λ0 the same effect is present but not completely. The transmitted light is not circularly polarized but instead is elliptically polarized. The cholesteric liquid crystals which exhibit this property of selective reflection of light in a region centered around some wavelength λ0 are said to be in the Grandjean or "disturbed" texture. If λ0 is in the visible spectrum, the liquid crystalline film appears to have the color corresponding to λ0 for normal incidence and normal viewing and if λ0 is outside the visible spectrum, the film appears colorless.

It is known that the pitch, $p$, of such liquid crystalline substances is sensitive to stimuli such as pressure, electric fields, etc. Thus, when optically negative liquid crystal substances are exposed to such stimuli the pitch, or repetition distance of the helical structure of the substance, changes and consequently the λ0 value, or the center wavelength of the wavelength band reflected by the substance, changes. Furthermore, the pitch is very sensitive to the presence of very small amounts of such stimuli and to very small changes therein. This characteristic of liquid crystalline substances having optically negative properties is utilized according to the invention to devise an extremely sensitive and inexpensive detection system. Thus, according to the invention, the wavelength band reflected by the liquid crystal film will change as the pressure or electric field applied to the liquid crystal film changes.

The novel and advantageous system of the invention is capable of detecting surface deformation patterns of less than a few microns. This is remarkable when it is realized that, in practical terms, this means that the system is capable of detecting a xerographically formed toner image on a sheet of ordinary paper. Also very small flaws in an electrically conductive surface may be detected according to the invention since the flaws will have different electrical conductivity characteristics from those of the adjacent areas. A very important practical advantage of the novel system is that the devices employed to detect the above-described patterns are relatively inexpensive since there is relatively little difficulty involved in the manufacture thereof and the materials themselves are not expensive. Further, the device is reusable and can scan very large areas rapidly.

The invention will be more readily understood and appreciated by those skilled in the art from the following detailed description of various preferred embodiments thereof particularly when read in relation to the accompanying drawings in which.

Figure 1:
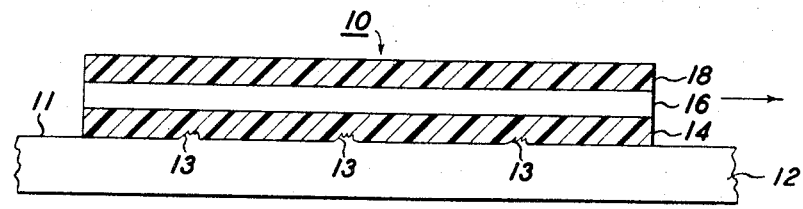
FIG. 1 is a schematic side cross-sectional view illustrating the practice of one embodiment of the invention.

Referring now to FIG. 1 there is seen a preferred embodiment of a detection device constructed according to the invention, generally designated 10, resting on a surface 11 of a material 12 which may be, for example, a sheet of paper bearing a xerographically formed toner image or a glass plate, and which is to be analyzed. Surface 11 is substantially smooth and has a physical deformation pattern represented by areas 13. Detection device 10 comprises, in this exemplary instance, a support substrate 14 carrying a thin film 16 of an optically negative liquid crystalline substance which in turn is covered by optional protective element 18. In accordance with this embodiment of the invention wherein the detection system relies upon the sensitivity of the pitch of the liquid crystal substance to changes in the pressure exerted thereon in order to identify the physical surface pattern of the surface of interest, support substrate 14 is typically a material having suitable flexibility properties in order to ensure that the surface deformation pattern may be accurately transmitted to the liquid crystal film.

Any suitable cholesteric liquid crystalline material, mixture of composition comprising cholesteric liquid crystals or composition having cholesteric liquid crystalline characteristics may be utilized for liquid crystal substances include derivatives from reactions of cholesterol and inorganic acids, such as, for example: cholesteryl chloride, cholesteryl bromide, cholesteryl iodide, cholesteryl fluoride, cholesteryl nitrate; esters derived from reactions of cholesterol and carboxylic acids; for example, cholesteryl crotonate; cholesteryl nonanoate; cholesteryl hexanoate; cholesteryl formate; cholesteryl docosonate; cholesteryl chloroformate; cholesteryl propionate; cholesteryl acetate; cholesteryl valerate; cholesteryl vaccenate; cholesteryl linolate; cholesteryl linoleate; cholesteryl oleate; cholesteryl erucate; cholesteryl butyrate; cholesteryl caproate; cholesteryl laurate; cholesteryl myristate; cholesteryl clupanodonate; ethers of cholesterol such as cholesteryl decyl ether; cholesteryl lauryl ether; cholesteryl oleyl ether; cholesteryl dodecyl ether; carbamates and carbonates of cholesterol such as cholesteryl decyl carbonate; cholesteryl oleyl carbonate; cholesteryl methyl carbonate; cholesteryl ethyl carbonate; cholesteryl butyl carbonate; cholesteryl docosonyl carbonate; cholesteryl cetyl carbonate; cholesteryl-p-nonylphenyl carbonate; cholesteryl-2-(2-ethoxyethoxy) ethyl carbonate; cholesteryl-2-(2-butoxyethoxy) ethyl carbonate; cholesteryl-2-(2-methoxyethoxy) ethyl carbonate; cholesteryl geranyl carbonate; cholesteryl heptyl carbamate; and alkyl amides and aliphatic secondary amines derived from 3β-amino Δ 5-cholestene and mixtures thereof; peptides such as poly-γ-benzyl-*l*-glutamate; derivatives of beta sitosterol such as sitosteryl chloride; and amyl ester of cyano benzylidene amino cinnamate. The alkyl groups in said compounds are typically saturated or unsaturated fatty acids, or alcohols, having less than about 25 carbon atoms, and unsaturated chains of less than about five double-bonded olefinic groups. Aryl groups in the above compounds typically comprise simply substituted benzene ring compounds. Any of the above compounds and mixtures thereof may be suitable for cholesteric liquid crystalline materials in the advantageous system of the present invention.

Compositions containing cholesteric liquid crystals and nematic liquid crystalline substances may also be utilized as the liquid crystal films of the detection system; and it has been found that such compositions may contain up to 98 percent by weight of the nematic component yet continue to function in accordance with the invention. Nematic liquid crystalline materials suitable for use in combination with cholesteric liquid crystalline materials in the advantageous system of the present invention include: p-azoxyanisole, p-ozoxyanisole, p-azoxyphenetole, p-butoxybenzoic acid. p-methoxycinnaminic acid, butyl-p-anisylidene-p'-aminocinnamate, anisylidene para-aminophenylacetate, p-ethoxy-benzylamino-a-methyl-cinnamicacid, 1,4-bis (p-ethoxy benzylidene) cyclo hexanone, 4,4'-dihexyloxybenzene, 4,4'-diheptyloxybenzene, anisal-p-amino-azobenzene, anisaldazine, a-benzeneazo-(anisal-$\alpha'$-naphthylamine), anisylidene-p-n-butylaniline, n,n'-nonoxybenzyltoluidine, mixtures of the above and many others.

Compositions suitable for use as liquid crystal films of the novel detection system may also comprise mixtures of cholesteric liquid crystals and suitable smectic liquid crystalline substances as well as mixtures of cholesteric liquid crystals and suitable non-liquid crystalline substances which are compatible with the cholesteric liquid crystal component. Typical suitable non-liquid crystalline materials include cholesterol, lecithin and the like. Typical suitable smectic liquid crystal substances include n-propyl-4'-ethoxy biphenyl-4-carboxylate; 5-chloro-6-n-heptyloxy-2-naphthoic acid; lower temperature mesophases of cholesteryl octanoate, cholesteryl nonanoate, and other open-chain aliphatic esters of cholesterol with chain length of 7 or greater; cholesteryl oleate; sitosteryl oleate; cholesteryl decanoate; cholesteryl laurate; cholesteryl myristate; cholesteryl palmitate; cholesteryl stearate; 4'-n-alkoxy-3'-nitrobiphenyl-4-carboxylic acids ethyl-p-azoxycinnamate; ethyl-p-4-ethoxybenzylidene-aminocinnamate; ethyl-p-azoxybenzoate; potassium oleate; ammonium oleate; p-n-octyloxy-benzoic acid; the low temperature mesophase of 2-p-n-alkoxy-benzlideneamino-fluorenones with chain length of 7 or greater; the low temperature mesophase of p-(n-heptyl) oxybenzoid acid; anhydrous sodium stearate; thallium (I) stearate; mixtures thereof ad others.

Mixtures of liquid crystals can be prepared in organic solvents such as chloroform, petroleum, ether and others, which are typically evaporated from the mixture thus leaving the liquid crystal composition. Alternatively, the individual components of the liquid crystalline mixture can be combined directly by heating the mixed components above the isotropic transition temperatures.

The above lists of suitable liquid crystalline imaging materials are intended to encompass mixtures of any of the above. The list is representative of suitable materials, and is in no way intended to be exhaustive or limiting. Although any liquid crystalline composition having cholesteric liquid crystalline characteristics is suitable for use in the present invention, it should be recognized that various different cholesteric liquid crystal substances or mixtures thereof or combinations of cholesteric liquid crystal substances with other substances such as nematic liquid crystals will typically possess the desired properties which make them suitable for use according to the invention in some specific temperature range which may be at room temperature or substantially above or below room temperature. However, all of the various substances, mixtures or combinations thereof will function according to the method of the invention at some temperature. Typically, the detection apparatus of the invention will be used at or near room temperature. Generally speaking, the liquid crystal substance will preferably have a liquid crystal state at the desired operational temperature. It is further preferred to utilize a liquid crystal substance which has a $\lambda 0$ in the visible region of the light spectrum since this would allow the device to be viewed by the human eye. Of course, liquid crystal films having $\lambda 0$ values in the ultraviolet or infrared regions of the electromagnetic spectrum may be employed. Liquid crystal substances are known or compositions thereof may be prepared having $\lambda 0$ values of from about 2,700 A. to about 10 microns. Where the $\lambda 0$ value of the liquid crystal film is not in the visible region an appropriate means for analyzing the reflected wavelength band typically will have to be utilized. Since the shift in $\lambda 0$ for the liquid crystal substance in response to the change in some stimulus such as pressure may be from longer to shorter wavelengths it is possible to select a liquid crystal substance having a $\lambda 0$ value in the near infrared so that when a change in stimulus occurs the $\lambda 0$ value thereof shifts to the visible region. Thus, the film appears colorless initially and typically would reflect red light when the change in the stimulus occurs.

The liquid crystal films employed in the detection system of the invention will typically have a thickness of from about 0.5 to about 20 microns. The liquid crystal film 16 is typically tacky, soft, viscous, or liquid and thus preferably covered by a protective element 18 to protect the film from foreign matter such as dust, insects or the like. The purpose of protective element 18 is to keep the liquid crystal film 16 contained and free of any contamination. Thus, the protective layer may be any suitable material, flexible or rigid, which is optically transparent to incident light and which is non-reactive with the liquid crystalline film. Typical suitable materials for this purpose include glass, fused silica, clear plastics such as Mylar, Tedlar, polyethylene, polypropylene or the like and any other materials having the desired characteristics.

As has been stated previously the support substrate 14 is typically a thin sheet and may be any suitably flexible material which is capable of transmitting the physical surface pattern of the liquid crystal film. It is preferred to employ a dark, colored material, typically black, to provide contrast in viewing the reflected light from liquid crystal film 16. The substrate typically will have a thickness of up to about 500 microns dependent upon the particular use envisioned for the device. Typical suitable substrate materials include Mylar, Tedlar, polyethylene, polypropylene or the like. Black Mylar, a polyethylene terephthalate commercially available from E.I. DuPont is particularly preferred because of its flexibility and physical strength and because it provides excellent contrast for viewing the color of the light reflected by the liquid crystal film.

The detection device of the invention is utilized by placing the support substrate carrying the liquid crystal film against the surface of interest and slowly moving the device across the surface. Alternatively, for optimum results the liquid crystal film may be covered with a protective element, e.g., a cover glass, and shear applied to the liquid crystal substance before the surface of interest is analyzed. The sensitivity of the system may be increased by uniformly exerting pressure downwardly on the device as the surface is being scanned. In order to detect for surface deformations such as high spots in an otherwise level surface the device is moved slowly across the surface. Wherever the device contacts a high spot the latter will exert pressure on the liquid crystal film through the substrate. Consequently the color of the light reflected by the device will change at this point since $\lambda 0$ for the liquid crystalline substance will have changed upon the application of pressure thereto. To illustrate the sensitivity of the invention in practical terms the system of the invention has been employed to identify a xerographically formed toner image on the surface of an ordinary sheet of paper.

The pressure sensitive nature of the liquid crystal substances may be utilized in the preparation of display panels in which the liquid crystal film is stimulated in imagwise fashion by pressure effects created in localized areas of the film by means of an electron beam or cathode ray tube presentation of images. Both impact effects and subsequent electrostatic pressure effects result from the application of an electron beam through the liquid crystal film. Thus the normal phosphor screen of a CRT display can be replaced with a sandwich of a thin dielectric sheet, a liquid crystal layer and a transparent substrate. In one embodiment of such a display panel the liquid crystal may have a $\lambda 0$ value in the infra-red region which shifts to some new value in the visible when the liquid crystal film is struck by an electron beam thus providing a display which involves a change from a colorless panel to some colored image.

Figure 2:
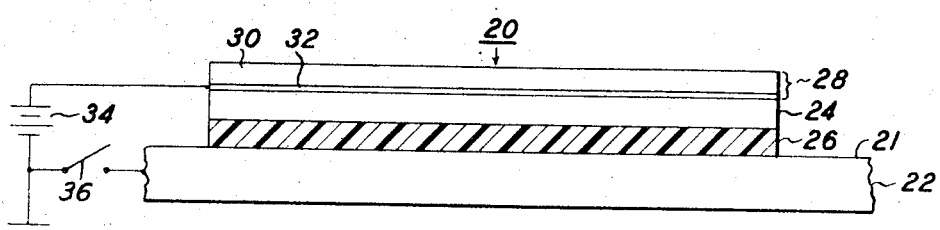
FIG. 2 is a schematic side cross-sectional view illustrating the practice of another embodiment of the invention.

As has been discussed previously the detection system of the invention is suitable for identifying areas in a surface which has different electrical conductivity characteristics than those of adjacent areas of the same surface. Referring now to FIG. 2 there is seen a detection device, generally designated 20 arranged on the surface 21 of the material 22 to be analyzed. In this exemplary instance detection device 20 comprises an optically negative liquid crystal film 24 disposed on support substrate 26 and covered by optional protective element, generally, designated 28.

According to this embodiment of the invention the support substrate 26 is placed against the surface of interest 21 and an electrical potential is applied to the liquid crystal film 24 such as by means of spraying charge from a Tesla coil thereon; or alternatively, where the protective element 28 is employed, by connecting the protective element to one side of a potential source 34 as illustrated. The other side of potential source 34 is connected to switch 36 and to the material 22 to be analyzed so that when switch 36 is closed an electric field is applied across the liquid crystal film 24 between protective element 28 and material 22.

Detection device 20 is placed against surface 21 with switch 36 closed. Since the pitch of the liquid crystal film is sensitive to changes in electric fields, any areas in surface 21 which have different electrical conductivity characteristics from those of adjacent areas can be identified. Various types of surfaces may be analyzed according to this mode of the practice of the invention. For example the surface may be one which has conductive and non-conductive areas respectively; or the surface may be of the same conductive material, for example a metal, but may contain flaws. As the electrical potential is applied to the detection device the wavelength band reflected by the liquid crystal film varies at any point above areas in surface 21 which have different electrical conductivity characteristics from those of adjacent areas. It is theorized that the respective areas have varying electric fields arranged above them and thus the pitch of the liquid crystal film is changed with a consequent change in the color of the reflected light. Although it is not intended to limit this invention to this theoretical explanation it is nevertheless consistent with observed experimental results and thus it is thought to be the mechanism by which this embodiment of the invention is operative.

According to this mode of the practice of the invention the cholesteric liquid crystal substance, composition, mixture, etc. utilized is typically substantially electrically insulating. Substantially pure cholesteric liquid crystal substances are typically substantially insulating materials. Substantially completely pure cholesteric liquid crystals having bulk resistivities of about $10^{13}$ ohm-cm or higher may be obtained by routine purification procedures such as, for example recrystallization from a suitable solvent. Further, according to this embodiment, substrate 26 is preferably more conductive than the particular liquid crystal material used in any instance since it promotes the formation of electric fields across the liquid crystal film and for optimum results is a dark colored material, typically black, so as to provide better contrast for viewing the light reflected by the liquid crystal film. Black Tedlar, a polyvinylfluoride commercially available from E. I. du Pont is preferred because it has the desired physical properties such as toughness and further because it is suitably conductive for use in this mode.

Although, as has been discussed above, the electrical potential may be applied directly to the liquid crystal film such as by depositing charge thereon by means of a Tesla coil it is preferred to employ optional protective element 28 since it typically prevents the electrical charge from leaking rapidly through the liquid crystal film. Optional element 28 can be of any of many various materials. For example where charge is applied by means of an external source such as a Tesla coil, outer element 28 may be any transparent, insulating material such as glass, fused silica, Mylar, polyethylene, polypropylene or the like. Where protective element 28 is connected to one side of a potential source as is illustrated in FIG. 2, the protective element is typically a thin layer of an insulating material having a high dielectric constant covered with a thin layer of a transparent conductive material, e.g., conductive tin oxide. Protective element 28, as illustrated, comprises a layer of optically transparent glass 30 carrying a thin optically transparent layer of tin oxide 32. Tin oxide coated glass of this nature is commercially available under the tradename NESA glass from Pittsburgh Plate Glass Company.

Figure 3:
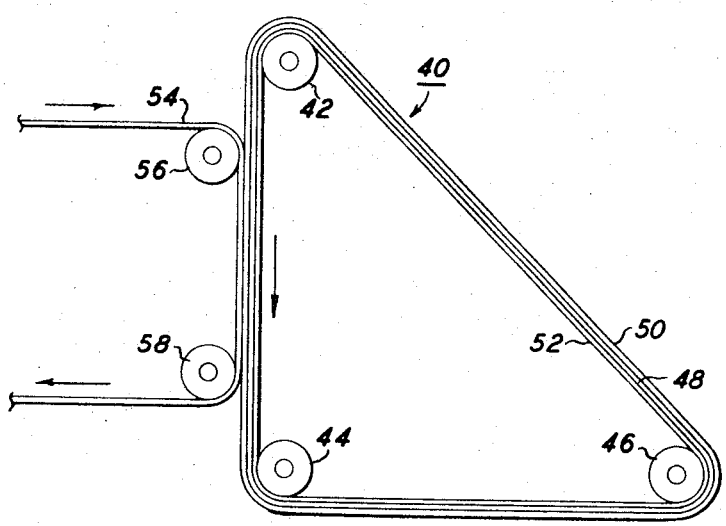
FIG. 3 is a schematic side cross-sectional view of an exemplary apparatus suitable for the practice of the invention in a continuous mode.

A wide range of voltages may be applied to the detection device according to this mode of the practice of the invention. Typically the voltage applied should be sufficient to provide an electric field of from about $10^3$ to about $10^6$ volts/cm across the liquid crystal film. Optimum results are obtained from higher electric fields since the contrast achieved is higher. The detection system of the invention may be employed in a continuous mode where it is so desired. Referring now to FIG. 3 there is seen a continuous, recycling member, generally designated 40 arranged on drive rollers 42, 44 and 46 respectively. Continuous member 40, in this exemplary instance, comprises a liquid crystal film 48 disposed between a flexible substrate 50 and flexible protective element 52 which may be any suitable optically transparent material such as those previously described. According to this embodiment, the surface 54 being analyzed is brought into moving contact with recycling member 40 and held in contact therewith by means of rollers 56 and 58. This embodiment of the invention would typically be utilized with respect to the identification of physical patterns in a surface of interest. Preferably the $\lambda 0$ value of the liquid crystal film 48 is in the visible region of the light spectrum whereby the color of the light reflected by the device may be observed by a human observer.

The invention will now be further described with respect to specific preferred embodiments by way of Examples it being understood that these are intended to be illustrative only and the invention is not limited to the materials, procedures, conditions, etc. recited therein. All parts and percentages stated in the Examples are by weight unless otherwise specified.

EXAMPLE I

A composition containing about 35% cholesteryl chloride (CC) and 65% cholesteryl nonanoate (CN) is preferred. The composition has a $\lambda 0$ value of about 6,600A. and thus the color of the reflected light at normal incidence and normal viewing is red. A thin film of this composition is applied to a sheet of black Mylar and a cover glass is then placed over the free surface of the liquid crystal film. The black Mylar substrate is placed against the surface of a paper sheet having thereon xerographically formed toner image characters (such as the characters appearing on this page). Xerographically formed images are typically a few microns in thickness. As the detection device is moved across the surface of the paper sheet the image characters can be clearly identified by a human observer and typically appear as green characters on a red background.

EXAMPLES II — XIII

The procedure followed in Example I is repeated in each instance using the particular compositions listed.

EXAMPLE II

A composition of about 30% CC and about 70% CN having a $\lambda 0$ value of about 5,800A.

EXAMPLE III

A composition of about 25% CC and about 75% CN having a $\lambda 0$ value of about 5,400A.

EXAMPLE IV

A composition of about 65% anisylidene-p-n-butylaniline (ABUTA) and about 35% cholesteryl oleyl carbonate (COC) having a $\lambda 0$ value of about 8,000A.

EXAMPLE V

A composition of about 10% cholesterol (CHOL) and about 90% COC having a $\lambda 0$ value of about 4,300A.

EXAMPLE VI

A composition of about 20% cholesteryl-2-(2-butoxy ethoxy) ethyl carbonate (CBEC) and about 80% CC having a $\lambda 0$ value of about 6,000A.

EXAMPLE VII

A composition of about 88% CC and about 12 percent of equal parts of cholesteryl propionate (CP) and cholesteryl decanoate (CD) having a $\lambda 0$ value of about 6,300A.

EXAMPLE VIII

A composition of about 74% CC and about 26% cholesteryl acetate (CA) having a $\lambda 0$ value of about 7,700A.

EXAMPLE IX

A composition of about 88 percent of equal parts of CC and cholesteryl butyrate (C-BUT) and about 12 percent of equal parts of cholesteryl formate (CF) and CD having a $\lambda 0$ value of about 8,000A.

EXAMPLE X

A composition of about 84% CC and about 16% cholesteryl valerate (CV) having a $\lambda 0$ value of about 7,100A.

EXAMPLE XI

A composition of about 89% CC and about 11% cholesteryl caproate (C-CAP) having a $\lambda 0$ value of about 6,200A.

EXAMPLE XII

A composition of about 86% CC and about 14% cholesteryl heptanoate (C-HEP) having a $\lambda 0$ value of about 7,100A.

EXAMPLE XIII

A composition of about 91% CC and about 9% cholesteryl stearate (CS) having $\lambda 0$ value of about 6,300A.

EXAMPLE XIV

Cholesteryl chloride (CC) cholesteryl nonanoate (CN) and cholesteryl oleyl carbonate (COC) are purified by recrystallization from a suitable solvent. A composition of about 30% CC, about 65% CN and about 5% COC is then prepared. The composition has substantially highly electrically insulating properties. A thin layer of the liquid crystal composition is applied to a 2 mil thick black Tedlar sheet and a cover glass is applied to the free surface of the liquid crystal film. The black Tedlar substrate is placed on a metal ruler and an electrical potential is applied to the cover glass by spraying charge from a Tesla coil thereon. The unit markings on the ruler are observed as green images on a red background.

EXAMPLES XV — XXIII

The procedure followed in Example XIV is repeated in each instance using the particular composition listed.

EXAMPLE XV

A composition of about 10% CC and about 90% cholesteryl bromide (CB) having a λ0 value of about 5,900A.

EXAMPLE XVI

A composition of about 20% cholesteryl hexanoate (CH) and about 80% CC having a λ0 value of about 7,400A.

EXAMPLE XVII

A composition of about 70% CF and about 30% CN having a λ0 value of about 6,000A.

EXAMPLE XVIII

A composition of about 50% cholesteryl iodide (CI) and about 50% CC having a λ0 value of about 5,900A.

EXAMPLE XIX

A composition of about 74% CC and about 26% CA having a λ0 value of about 7,700A.

EXAMPLE XX

A composition of about 84% CC and about 16% CV having a λ0 value of about 7,100A.

EXAMPLE XXI

A composition of about 83% CC and about 17% C-CAP having a λ0 value of about 8,100A.

EXAMPLE XXII

A composition of about 87% CC and about 13% CS having a λ0 value of about 8,300A.

EXAMPLE XXIII

A composition of about 90% CC and about 10% cholesteryl laurate (CL) having a λ0 value of about 6,600A.

Although the invention has been described in detail with respect to various preferred embodiments and further by means of specific preferred embodiments by way of examples it will be apparent to those skilled in the art that the invention is not limited thereto but rather that variations and modifications are possible which are within the spirit of the invention and the scope of the appended claims. For example, in order to analyze a contoured surface for the presence of flaws, etc. the substrate material may be sprayed over the surface of interest, allowed to harden and a layer of liquid crystalline material applied to the hardened substrate. A protective outer layer may then be applied over the liquid crystal layer if so desired. An electric field can then be applied across the liquid crystal film according to the procedures described above.

What is claimed is:

1. A method for identifying physical surface patterns in a surface of interest comprising the steps of:
   a. providing a detection device comprising a support substrate carrying a thin layer of a liquid crystalline substance having optically negative properties, wherein said liquid crystalline substance exhibits the property that the position of the dominant wavelength reflected thereby is sensitive to pressure, said support substrate comprising a suitable flexible material; and
   b. bringing the surface of said support substrate remote from said liquid crystalline layer into contact with a surface of interest having a physical surface pattern therein whereby said physical surface pattern is observed.

2. The method as defined in claim 1 wherein uniform pressure is exerted downwardly upon said detection device while said device is in contact with said surface of interest.

3. The method as defined in claim 1 wherein the λ0 value of said liquid crystalline substance is in the visible region of the light spectrum.

4. The method as defined in claim 1 wherein said liquid crystalline substance is selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with the liquid crystalline substances; and mixtures thereof.

5. The method as defined in claim 1 wherein said support substrate comprises black polyethylene terephthalate.

6. The method as defined in claim 1 wherein said detection device further includes a thin optically transparent element overlying said liquid crystalline layer.

7. The method as defined in claim 6 wherein said detection device comprises a continuous recycling member and said surface of interest is brought into moving contact with said detection device.

8. The method as defined in claim 1 wherein said liquid crystalline layer is from about 0.5 to about 20 microns in thickness.

9. The method as defined in claim 3 wherein said liquid crystalline layer is from about 3 to about 10 microns in thickness.

10. A method for identifying areas in a surface of interest which have different electrical conductivity characteristics than those of adjacent areas of the same surface comprising the steps of:
    a. providing a detection device comprising a support substrate carrying a thin layer of a liquid crystalline substance having optically negative properties, wherein said liquid crystalline substance exhibits the property that the dominant wavelength reflected thereby is sensitive to an applied electric field, said liquid crystalline substance having substantially highly electrically insulating properties;
    b. bringing the surface of said support substrate remote from said liquid crystalline layer into contact with a surface of interest having areas of different electrical conductivity characteristics; and
    c. applying a potential to said liquid crystalline layer wherein said potential is sufficient to cause a change in the position of the dominant wavelength reflected by said layer whereby said areas having different electrical conductivity characteristics are observed.

11. The method as defined in claim 10 wherein the λ0 value of said liquid crystalline substance is in the visible region of the light spectrum.

12. The method as defined in claim 10 wherein said liquid crystalline substance has a bulk resistivity of about $10^{13}$ ohm-cm or above.

13. The method as defined in claim 10 wherein said detection device further includes a thin, optically transparent element overlying said liquid crystalline layer and the potential is applied to said optically transparent element.

14. The method as defined in claim 10 wherein said support substrate comprises a material which is more electrically conductive than said liquid crystalline substance.

15. The method as defined in claim 10 wherein said support substrate comprises black polyvinylfluoride.

16. The method as defined in claim 13 wherein said optically transparent element comprises a layer of optically transparent glass carrying a thin layer of conductive material and said thin layer of conductive material is placed adjacent said liquid crystalline layer.

17. The metnod as defined in claim 13 wherein the potential applied to said detection device is sufficient to create an electrical field of from about $10^3$ to about $10^6$ volts/cm across said liquid crystal layer.

18. A detection device for detecting electrical conductivity patterns in a surface of interest when the device is placed in contact with the surface of interest comprising a support substrate carrying a layer of a liquid crystalline substance having optically negative properties, said layer having a thickness of from about 0.5 to about 20 microns, and an optically transparent electrode overlying said liquid crystalline layer, wherein said optically transparent electrode is the only electrode in the detection device and is capable of establishing an electric field, in association with the surface of interest, across at least a portion of said liquid crystalline layer.

19. The device as defined in claim 18 wherein said substrate is a flexible material.

20. The device as defined in claim 18 wherein the $\lambda 0$ value of said liquid crystalline substance is in the visible region of the spectrum.

21. The device as defined in claim 20 wherein said liquid crystalline layer is from about 3 to about 10 microns in thickness.

22. The device as defined in claim 18 wherein said liquid crystalline substance is selected from the group consisting of: cholesteric liquid crystalline substances; mixtures of cholesteric liquid crystalline substances and nematic liquid crystalline substances; mixtures of cholesteric liquid crystalline substances and smectic liquid crystalline substances; mixtures of cholesteric liquid crystalline substances and non-liquid crystalline substances which are compatible with the cholesteric liquid crystalline substances; and mixtures thereof.

23. The device as defined in claim 28 wherein said support substrate comprises black polyethylene terephthalate.

24. The device as defined in claim 18 wherein said liquid crystalline substance is substantially electrically insulating having a bulk resistivity of about $10^{13}$ ohm-cm or above.

25. The device as defined in claim 24 wherein said support substrate comprises black polyvinylfluoride.

26. The device as defined in claim 18 wherein said optically transparent electrode comprises a layer of glass carrying a thin layer of conductive material.

* * * * *

UNITED STATES PATENT OFFICE
CERTIFICATE OF CORRECTION

Patent No. 3,744,920         Dated July 10, 1973

Inventor(s) JAMES E. ADAMS and WERNER E. L. HAAS

It is certified that error appears in the above-identified patent and that said Letters Patent are hereby corrected as shown below:

Column 4, after Line 34 and before Line 35 insert ---film 16. Typical suitable cholesteric liquid crystal---.

Claim 23, Line 1 "28" should read ---19---.

Signed and sealed this 21st day of May 1974.

(SEAL)
Attest:

EDWARD M.FLETCHER,JR.
Attesting Officer

C. MARSHALL DANN
Commissioner of Patents